United States Patent
Cratsenburg et al.

(10) Patent No.: US 10,200,866 B1
(45) Date of Patent: Feb. 5, 2019

(54) METHOD AND SYSTEM FOR DETECTING AND MINIMIZING HARMFUL NETWORK DEVICE AND APPLICATION BEHAVIOR ON CELLULAR NETWORKS

(71) Applicant: Aeris Communications, Inc., Santa Clara, CA (US)

(72) Inventors: Mark E. Cratsenburg, Orinda, CA (US); Stephen Blackburn, Scotts Valley, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 14/961,732

(22) Filed: Dec. 7, 2015

Related U.S. Application Data

(60) Provisional application No. 62/091,443, filed on Dec. 12, 2014.

(51) Int. Cl.
*H04W 24/00* (2009.01)
*H04W 12/08* (2009.01)
*H04W 12/06* (2009.01)
*H04W 24/08* (2009.01)
*H04W 4/12* (2009.01)
*H04L 29/06* (2006.01)

(52) U.S. Cl.
CPC .......... *H04W 12/08* (2013.01); *H04L 63/105* (2013.01); *H04L 63/1408* (2013.01); *H04W 4/12* (2013.01); *H04W 12/06* (2013.01); *H04W 24/08* (2013.01)

(58) Field of Classification Search
CPC ..... H04W 8/245; H04W 24/00; H04W 24/08; H04M 1/72525
USPC ....... 455/410–412.2, 414.2, 418–425, 452.2, 455/550.1–552.1
See application file for complete search history.

(56) References Cited

U.S. PATENT DOCUMENTS

| | | | |
|---|---|---|---|
| 6,859,922 B1 | 2/2005 | Baker et al. | |
| 7,457,729 B2 | 11/2008 | Khoche et al. | |
| 8,270,952 B2 | 9/2012 | Raleigh | |
| 8,307,050 B2 | 11/2012 | Shevenell | |
| 8,325,614 B2 | 12/2012 | Poon et al. | |
| 8,515,015 B2 | 8/2013 | Maffre et al. | |
| 8,811,196 B2 | 8/2014 | Huq et al. | |
| 8,819,638 B2 | 8/2014 | Sharma et al. | |
| 8,893,009 B2 | 11/2014 | Raleigh et al. | |
| 2003/0017842 A1* | 1/2003 | Moles | H04W 36/30 455/552.1 |
| 2008/0043726 A1* | 2/2008 | Herrero-Veron | H04W 8/18 370/352 |
| 2009/0156198 A1* | 6/2009 | Lee | H04W 24/08 455/425 |

(Continued)

*Primary Examiner* — Dai A Phuong
(74) *Attorney, Agent, or Firm* — Brundidge & Stanger, P.C.

(57) ABSTRACT

A computer-implemented method and system for detecting and minimizing harmful network device and application behavior on a cellular network are disclosed. The method and system comprise providing predefined rules of behavior for a deployed device on a cellular network, wherein the deployed device is a device with cellular connectivity deployed with an application; and monitoring network behavior of the deployed device based upon self certification of the application and testing of the deployed device to detect harmful behavior of the deployed device.

18 Claims, 5 Drawing Sheets

(56) References Cited

U.S. PATENT DOCUMENTS

| | | | |
|---|---|---|---|
| 2010/0003923 A1* | 1/2010 | McKerlich | H04L 12/14 455/67.11 |
| 2010/0188993 A1 | 7/2010 | Raleigh | |
| 2010/0218171 A1* | 8/2010 | Munson | G06F 11/3644 717/127 |
| 2011/0282642 A1 | 11/2011 | Kruger et al. | |
| 2012/0246731 A1* | 9/2012 | Blaisdell | G06F 21/54 726/26 |
| 2012/0297367 A1* | 11/2012 | Mujeeb | G06F 11/3688 717/125 |
| 2013/0054170 A1 | 2/2013 | Sobajic et al. | |
| 2013/0122861 A1* | 5/2013 | Kim | G06F 21/51 455/410 |
| 2013/0297754 A1* | 11/2013 | Wentink | H04W 48/18 709/220 |
| 2013/0305359 A1 | 11/2013 | Gathala et al. | |
| 2014/0026122 A1 | 1/2014 | Markande et al. | |
| 2014/0126469 A1* | 5/2014 | Youtz | H04W 48/02 370/328 |
| 2014/0188412 A1 | 7/2014 | Mahajan et al. | |
| 2014/0316926 A1 | 10/2014 | Gounares et al. | |
| 2015/0094019 A1* | 4/2015 | McNamee | H04L 12/1407 455/406 |
| 2015/0133077 A1* | 5/2015 | Collins | H04L 43/00 455/405 |
| 2016/0036779 A1* | 2/2016 | Collins | H04L 43/00 726/12 |
| 2016/0134630 A1* | 5/2016 | Tofighbakhsh | H04L 63/08 726/7 |
| 2016/0255506 A1* | 9/2016 | Li | G06F 3/0481 455/410 |
| 2016/0277194 A1* | 9/2016 | Sun | H04L 9/3247 |
| 2017/0238210 A1* | 8/2017 | Belghoul | H04W 28/08 370/331 |

* cited by examiner

METHOD AND SYSTEM FOR DETECTING AND MINIMIZING HARMFUL NETWORK DEVICE AND APPLICATION BEHAVIOR ON CELLULAR NETWORKS

CROSS-REFERENCE TO RELATED APPLICATIONS

Under 35 USC 119(e), this application claims priority to U.S. provisional application Ser. No. 62/091,443, filed on Dec. 12, 2014 which is incorporated herein in its entirety.

FIELD OF THE INVENTION

The present invention relates generally to cellular networks and more particularly to the behavior on cellular networks of devices connected to the network and the applications operating in conjunction with such devices.

BACKGROUND

Industry experts predict that over 50 billion devices will be connected in the Internet of Things (IoT), and many of those devices will use cellular networks for connectivity. Similar to the Internet itself, innovation fueled by low device cost, very low barriers to application development and deployment of solutions containing such applications operating the devices will drive this massive explosion of devices. Unfortunately, absorbing this growth poses challenges for cellular networks, which are fundamentally different from the networks supporting the internet for a number of reasons. Devices deployed on cellular networks must connect to and disconnect from those networks more frequently than devices connected to wired internet networks. Network elements that authenticate devices trying to connect are highly concentrated, and access to network resources, such as cell towers, is geographically concentrated and restricted. Accordingly, cellular devices and applications that are poorly designed or operating improperly can impact other users of the cellular network much more directly than in the normal internet, especially in the case of connected machines whose behavior is controlled by algorithms rather than random action of individuals. For example, it is unlikely that every human in proximity to a given cell tower will choose to initiate a data session at precisely the same moment in time, but a group of machines programmed to operate in a particular way could do so, overloading network resources.

This creates a conflict between people developing integrated service solutions, where devices are connected with specific service oriented applications, who want unrestricted access to cellular networks, and cellular network carriers who want to limit network access to service solutions that do not behave in a harmful manner. In an ideal circumstance, cellular network carriers would approve service solutions before permitting them to access the network. While it is possible for a party intending to deploy service solutions on a cellular network to request that the cellular network carrier verify and certify that the devices deployed as service solutions operate in conformance with that carrier's rules, such certification is both time-consuming and costly. Publication by the carrier of guidelines for device and application behavior, while informative, does not prove compliance to the carrier or allow the party intending to deploy such service solutions to test actual operation and confirm conformance prior to commercial deployment.

Hence, it is desirable to provide a system and method which address the above identified issues. The system and method should be easy to implement, cost effective and adaptable to existing systems. The present invention addresses such a need.

SUMMARY

A computer-implemented method and system for enabling persons intending to deploy integrated service solutions, where devices are connected with specific service oriented applications on cellular networks, to determine on a self-service basis if such devices (and applications operating with respect to such devices) behave in conformance with the cellular carrier's requirements and for detecting and minimizing harmful behavior of devices and applications deployed as integrated service solutions on a cellular network are disclosed. The computer-implemented method and system comprise providing predefined rules of behavior for a deployed device on a cellular network, wherein the deployed device is a device with cellular connectivity deployed with an application; and monitoring network behavior of the deployed device based upon self certification of the application and testing of the deployed device to detect harmful behavior of the deployed device.

DETAILED DESCRIPTION

Figure 1:
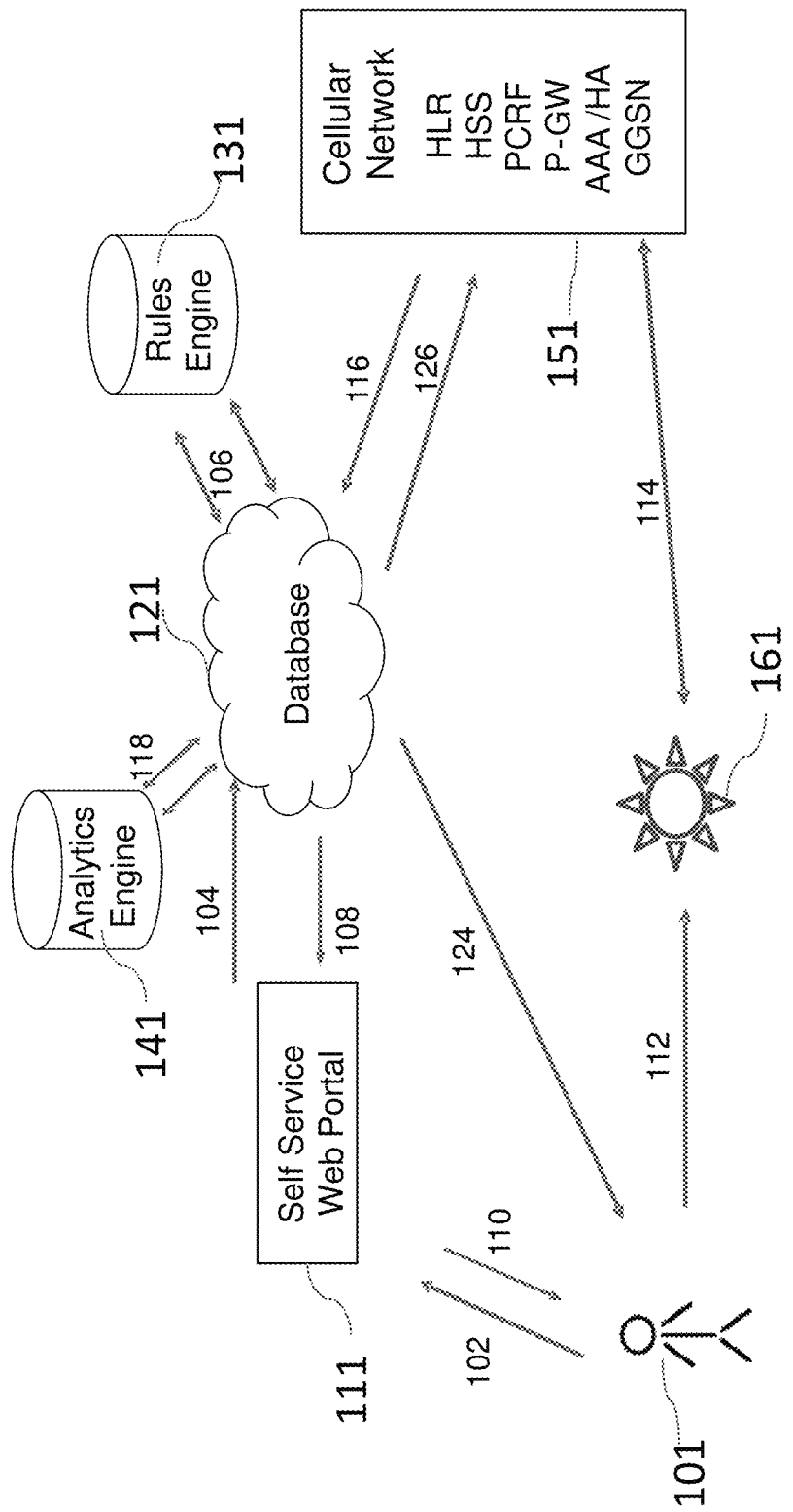
FIG. 1 is an overview diagram for the method and system according to an embodiment of the invention.

The present invention relates generally to cellular networks and more particularly to the behavior of applications and devices with cellular connectivity deployed as integrated service solutions. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A computer-implemented method and system for enabling persons intending to deploy integrated service solutions, where devices are connected with specific service oriented applications on cellular networks, to determine on a self-service basis if such devices (and applications operating with respect to such devices) behave in conformance with the cellular carrier's requirements and for detecting and minimizing harmful behavior of devices and applications deployed as integrated service solutions on a cellular network are disclosed. The method and system comprise a way for a device manufacturer, integrated solution provider, device user or other party (referred to for convenience as a "device owner"), on a self-service basis, to test, verify and certify that a service solution to be deployed on a cellular network operates in conformance with the predefined rules for device and application behavior established by a cellular network carrier. The method includes soliciting information from the device owner about the device and application and analyzing such information for conformance to a carrier's predefined rules, allowing devices believed to conform to access the network and interact with applications that conform, monitoring the actual behavior of deployed devices during a testing process to detect instances where such behavior does not conform with the carrier's predefined rules; allowing devices that conform during a testing process to access the network; and monitoring the actual behavior of the devices deployed as self-certified service solutions to detect instances where such behavior does not conform with the carrier's predefined rules.

In an embodiment, there are two aspects, Phase I and Phase II, to the solution described herein. Phase I includes an automated method and system whereby a device owner can obtain a certification from a cellular network operator that its devices and the applications with respect to those devices that are part of the integrated service solution conform to the requirements of a cellular network, including testing of the device and its applications in a production environment. Phase II includes an automated method and system for monitoring actual behavior of the devices deployed as self-certified service solution on the cellular network and, when behavior of the device is out of compliance, implementing various actions to notify responsible parties and to minimize network disruption.

The primary advantage of the self-service process for certifying integrated service solutions is to eliminate the need to engage the cellular network operator or another party to perform this certification, which is both time consuming and costly. The primary advantage of the continuous monitoring is that it enables, in an automated way, real time analysis of the behavior of devices deployed as service solutions with respect to conformance with the rules established by a cellular network operator for behavior of deployed devices and applications, delivery of warnings to device owners, solution providers and/or network providers when devices or applications are out of compliance, and execution of a series of actions to minimize or end harmful device or application behavior that has not been corrected. To describe the features of the present invention in more detail refer now to the following description in conjunction with the accompanying Figures.

FIG. 1 is an overview diagram illustrating a process and system for determining conformance of devices and applications that are part of the integrated service solutions with cellular network requirements, testing devices and applications, and certifying service solutions according to an embodiment of the invention. The starting point for this system is a self-service conformance function for an integrated service solution containing an application to be used in conjunction with network devices, comprising application and device behavior rules stored in a database 121 and a rules engine 131. The application and device behavior rules are defined by a network carrier for behavior of devices deployed as service solutions that use the network operated by that carrier. These rules are entered by the network carrier into the rules engine 131 which is used to determine if the device and application to be used in conjunction with the device conforms to application and device behavior rules.

Typical application and device behavior rules comprise two components: one is to fulfill compliance requirements with government regulation such as Federal Communications Commission (FCC) rules or PTCRB (a pseudo-acronym originally created for Personal Communication Service Type Certification Review Board) certification, and the other component is rules for proper network behavior such as but not limited to proper initiation of data sessions, proper transmission of data, as either Internet Protocol (IP) data or Short messaging Service (SMS), proper closure of IP data sessions, timing and duration of packet sessions, algorithms governing re-try attempts that include intervals for retries, backing off of retries, and avoidance of any activity that would have an infinite number of attempts to accomplish something, programming delays and randomness into device behavior across a deployed fleet of devices.

To fulfill compliance requirements with government regulations such as FCC rules or PTCRB certification, a device owner (customer) 101 can generally obtain documentation through their device manufacturer and can simply submit documentation of proper approvals via step 102 through a self service web portal 111. To ensure proper initiation of data sessions such as establishing a data session, the device working in conjunction with the application must request network access for a data session from the carrier's core network authentication elements 151. Behavior of the device or application 161 would be considered harmful when multiple requests for data sessions are made rapidly from many devices, or multiple requests for data sessions are made by the same device but through different sources such as radio modules and applications working in conjunction with that device.

To begin self certification, a device owner 101 enters expected behavior of a device and application working in conjunction with that device for which certification is requested across key areas such as connection methodologies and parameters, retry methodologies etc. in response to a questionnaire into a web portal 111 operated by a cellular network operator or other party via step 102. The web portal 111 stores these responses in a device behavior database 121 via step 104. These responses are then checked by the rules engine 131 against rules for application and device behavior established by the cellular network operator via step 106, and a pass/fail response is issued to the self-service portal 111 via step 108 and to the device owner 101 via step 110. In the event of pass, authorization is triggered in a core cellular network 151 to allow the devices and applications a limited access to the network for the purpose of testing. This is done by an automated trigger on the service profile for that device owner's rate plan which enables the services to be used by the device owner 101.

For automated device and application testing, device owner 101 with a device 161 would test to confirm that the device and application working in conjunction with that device 161 is operating as designed, and is in conformance with the application and device behavior rules also known as carrier rules. To accomplish this, the device owner 101 goes to the web portal 111 and enters the device identification number (for example, International Mobile Subscriber Identity (IMSI), Mobile Equipment Identifier (MEID), Mobile Identification Number (MIN) etc.) of the device they would like to test and initiate a test via step 114. Once the device

161 is powered on, its network registration is seen by the cellular network 151, indicating on the portal 111 that the device 161 is visible, and testing begins. The device owner 101 is then requested to perform specific steps, which may include, but are not limited to, some or all of powering the device 161 on, establishing a data session, ending a data session, sending an SMS, making a voice call and establishing a data session and keeping it active.

As the data is transmitted through the network during testing, network authentication and accounting records are examined for each of the above mentioned events to determine success or failure for conformance with the rules for the behavior of the devices and applications. In addition, functionality is determined, depending on the device and application being tested, by sending one or more of Mobile Terminating (MT) voice and SMS calls. Finally, retry attempts by the device and application 161 for both network access and data sessions are tested by forcing a break in the connection and capturing device behavior for retries. Once the tests are complete, a pass/fail analysis is provided to the device owner 101 along with a summary of performance statistics. In the event of pass, authorization is triggered in core cellular network 151 to allow production access to the cellular network for deployment of now certified integrated service solution.

Analytics engine 141 monitors real world performance of the device 161 which is now deployed as an integrated service solution (deployed devices) that is on the cellular network by using information it naturally generates regarding performance of the device 161 via step 116 by comparing live streaming transaction data against known device transaction anomalies. Authentication/signaling and transmission of data by the deployed devices generate network statistics. Some of the key information that is captured and logged into database 151 constituting "real world performance" includes, but is not limited to, time stamp of every network registration event from Home Location Register (HLR), underlying carrier of every network registration event from HLR, success or failure of network registration from HLR, time stamp of every IP session authentication request from Authentication, Authorization and Accounting (AAA), data records of amount of data sent during an IP Session, IP address assigned to each individual IP session, time stamp of every SMS attempt, success or failure for every SMS attempt, IP address for outbound IP session attempts. This "real world performance" of device 161 is compared against known device transaction anomalies of the deployed devices operating over the cellular network via step 118. If an anomaly or a rule violation is detected, the device owner 101 is notified via step 124.

Rule violations or anomalous behavior by deployed devices are grouped into three categories depending on their impact on the device 161 as well as overall network performance. Violations that are low impact generate a notice via step 124 to the device owner 101 with a defined time frame for resolution and escalation. For example, network carrier/operator logs the total byte count of each data session. If a device 161 or a group of devices were establishing multiple IP sessions, but not sending data, resulting in usage of limited network resources that does not relate to any successful transfer of data, the event is noted as a "zero byte session". The analytics engine 141 monitors for such 'zero byte sessions' and when they are noted, the analytics engine 141 pushes a notification to inform the device owner 101 of the issue.

Violations that are of high impact generate a notice to the device owner 101 with a very short window for correction via step 124 before taking corrective actions to modify the behavior. For example, if the device owner 101 had incorrectly programmed their device 161 and Point To Point (PPP) stack in both the radio module as well as in the application were trying to establish an IP session, the database of authentication information would contain multiple authentication requests from the same device 161. The analytics engine 141 sees this in real time from the database, identifies it as anomalous behavior of the device by comparing against known device transaction anomalies, and generates a notice to the device owner 101 to resolve the issue within 24 hours. If the issue remains or continues to occur after 24 hours have elapsed, the analytics engine 141 would automatically update IP session authentication elements to block IP session access for those devices via step 126.

Violations that are severe generate a notice to the device owner 101 via step 124 as well as automated actions by the carrier to resolve the issue via step 126. For example, if the device 161 began attempting several IP sessions at the exact same time, and retried every 3 seconds infinitely, it could potentially cause an outage of the network it is operating on. In such case, the analytics engine 141 sees the activity in the database, identifies it as anomalous behavior of the device and takes an automated action to block access to the device 161 via step 126.

This is also observed in case of potential malicious behavior. For example, if a large group of deployed devices suddenly started pinging a new IP address outside of their normal profile, potentially causing a Denial of Service (DOS) attack, that activity is noted by the analytics engine 141 and automated action is taken in response to the malicious activity to block that outbound activity via step 126.

Automated corrective action depends on the individual case and could be customized in analytics engine 141. For example, IP access inbound to device 161, or outbound from device 161 could be blocked by the network operator or by the device owner, by refusing authentication for IP services or network registration. Devices can also be proactively shut down by over the air clearing of the Preferred Roaming List (PRL) or the Public Land Mobile Network (PLMN) list, or the deployed device 161 is prevented from accessing the network at device level.

Figure 2A:
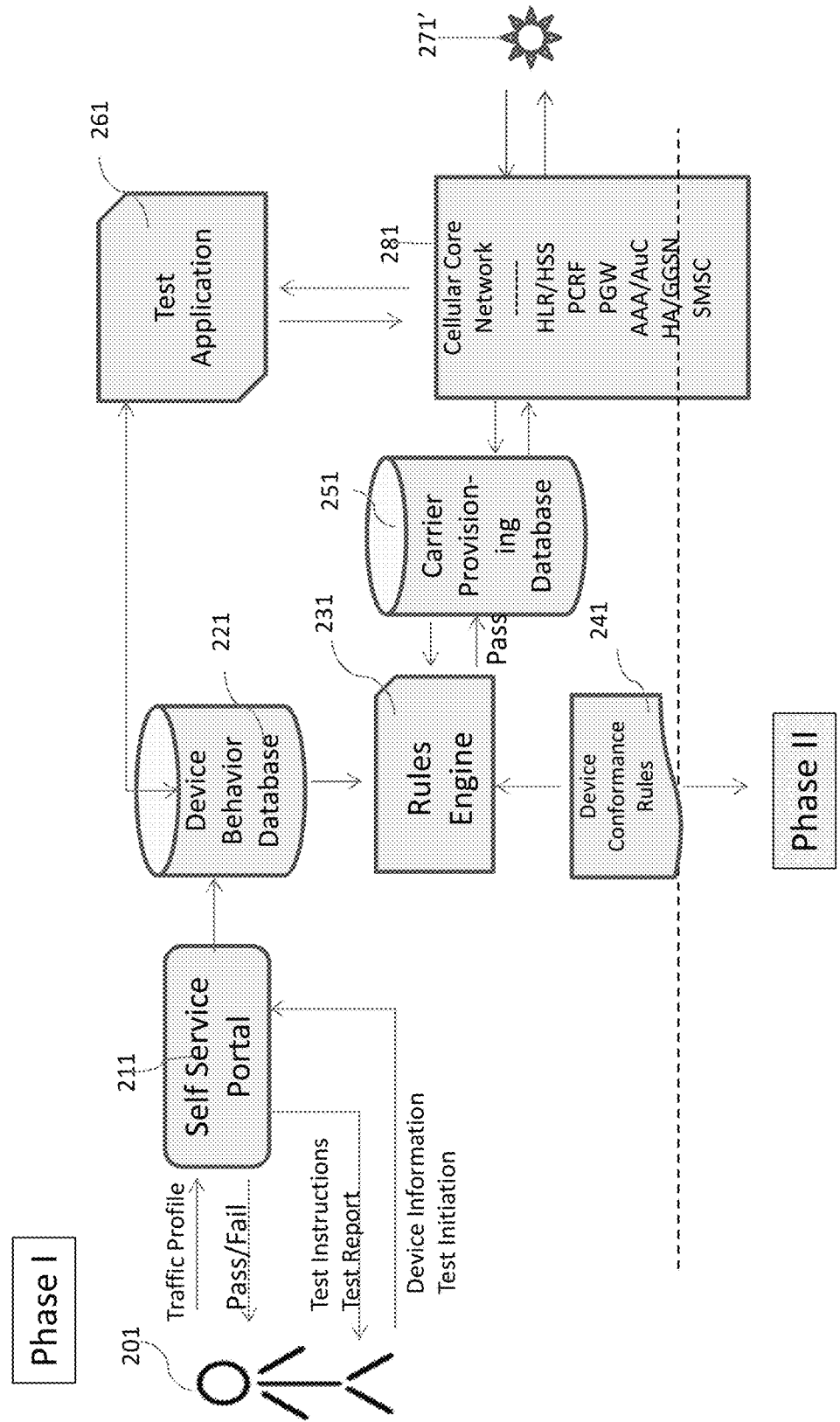
FIG. 2*a* illustrates a process and system for determining conformance of devices and applications that are part of the integrated service solutions with cellular network requirements, testing devices and applications, and certifying service solutions according to an embodiment of the invention.
Figure 2B:
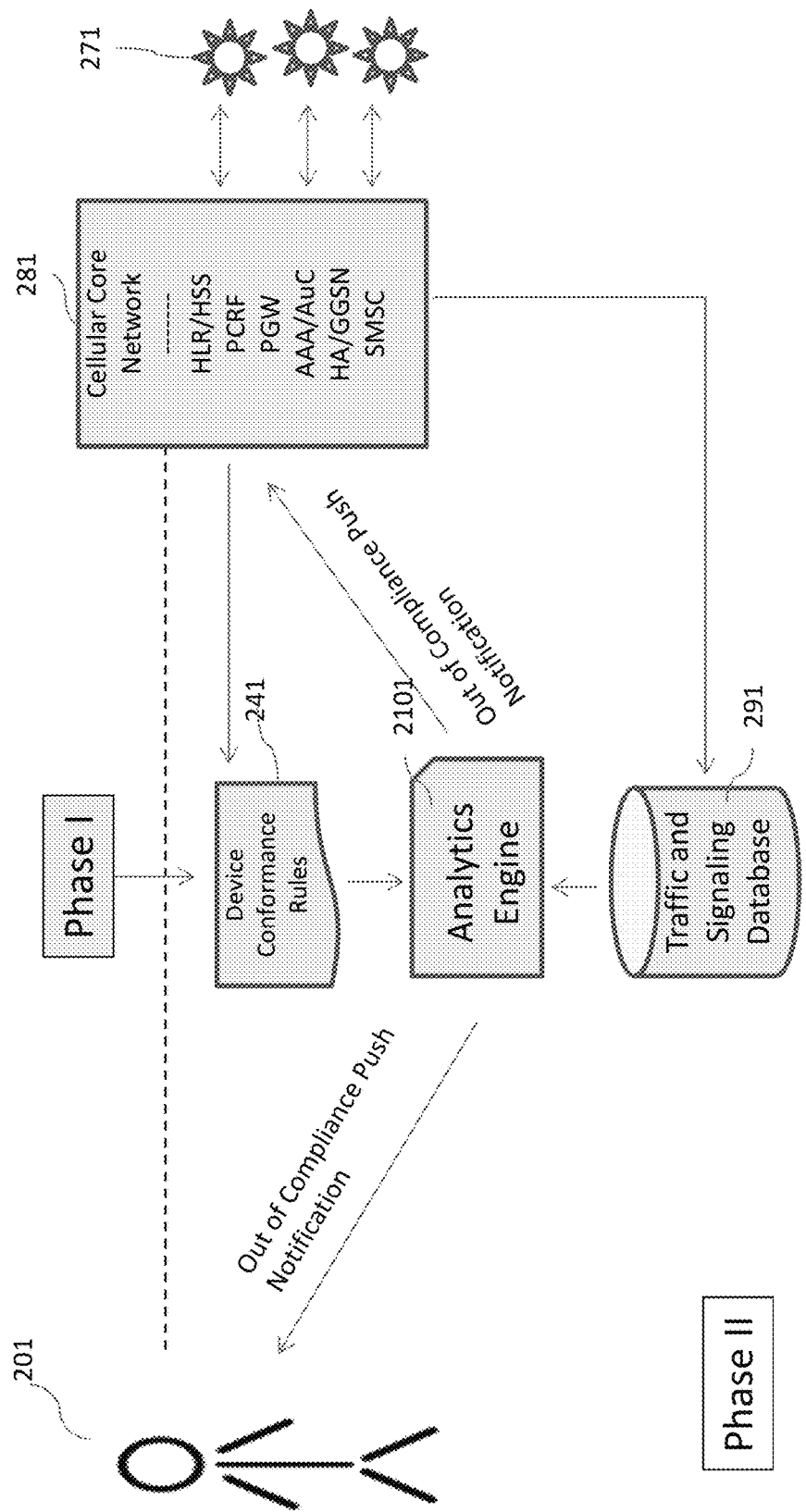
FIG. 2*b* illustrates a process and system for monitoring conformance of devices and applications that are part of the integrated service solutions with cellular network requirements according to an embodiment of the invention.

FIGS. 2a and 2b illustrate Phase I and Phase II of a system for automated self-service certification, testing and real time monitoring of the service solution according to an embodiment of the invention. Phase I further includes two steps, step 1 includes analysis of expected behavior of devices and their applications as integrated service solutions with respect to conformance with network rules and step 2 includes automated testing of the device and its applications and the device deployed as a self-certified service solution to determine actual behavior in a production environment. Phase II includes continuous real-time monitoring and analysis of actual behavior on the cellular network of devices deployed as self-certified service solutions in accordance with an embodiment of the present invention.

Phase I, step 1 includes self-service certification of integrated service solutions containing devices and applications. This aspect of the invention consists of a method and system in accordance with an embodiment that allows for a rapid, automated and self-service process by which a device owner, application developer, integrated solution provider or other party (collectively referred to as "device owner" for convenience) may receive certification for a device or application to be deployed as an integrated service solution. This process will enable device owners to complete development including certification of service solutions quickly, at lower cost than seeking manual certification by the cellular network operator and with a higher level of certainty for both device owner and network operator that the service solution will not cause network issues, thereby enabling device owners to launch commercial integrated service solutions with minimum barriers while minimizing disruptions to access to network resources for all customers of that network operator.

As illustrated in FIG. 2a, a self-service web portal 211 operated by a cellular network operator or other party enables a device owner 201 to complete the certification process. First, the device owner 201 enters information into a system on self-service web portal 211 in response to queries relevant to the device or application to be deployed as a service solution for which certification is requested. The information includes the design and expected behavior of the device or application across key areas such as connection methodologies and parameters, retry methodologies and the like and to store that information in device behavior database 221 for future reference. The self-reported information is collected and compared by a rules engine 231 against rules for device and application behavior established and stored in device conformance rules database 241 by the cellular network operator to determine conformance, with a pass/fail response provided to the device owner 201.

If the device or application receives a pass response, the carrier provisioning database 251 and HLR 281 are instructed to permit the service solution 271' to access the network production environment for the limited purpose of completing an automated test sequence, and the device owner 201 is notified that it should initiate an automated test sequence run by a test application 261 that will see how the device or application to be deployed as a service solution 271' functions in certain situations (which may consist of one or more of initial session startup, session terminated, server busy, message not delivered, etc.). The behavior of the device or application 271' during this test process is collected by the cellular core network 281 then compared to the expected device behavior stored in device behavior database 221 and device conformance rules 241 for compliance with the cellular network operator's rules by rules engine 231. Feedback on such performance is provided to the device owner 201.

If actual behavior during test sequence is not in conformance with the rules, the device owner 201 will be notified and provided information about test results and areas of deficiency, allowing the device owner 201 to modify the device or application and initiate the certification process again after completing modifications. If the actual behavior during the test sequence conforms both to expected behavior and to the rules, the device owner 201 and the carrier provisioning database 251 and HLR 281 are notified that such service solution will be permitted access to the network in a commercial production environment (i.e., the service solution will be "certified").

FIG. 2b illustrates Phase II of the solution which includes monitoring behavior of devices and applications deployed as service solutions and correction of problems. In this aspect of the invention, the behavior of devices and applications deployed as service solutions 271 on the network are monitored on a continuous basis, and data about actual network behavior of the devices and applications is collected by the carrier's traffic and signaling database 291. This data is analyzed by an analytics engine 2101 to determine ongoing compliance with network operator rules such as rules in device conformance rules database 241 and may also be compared with any other rules engines or databases operated by the cellular network operator or a service provider, similar to the operation of a common malware program, for purposes of detecting known causes of aberrant device or application behavior or network disruption, both unintentional and malicious. The method and system also allows for the analytics engine 2101 to automatically initiate notification procedures and corrective actions if the devices or applications are not in conformance with network rules. The corrective actions would range from blocking network access to non-conforming devices to, in extreme cases, rendering a device inoperable by instructions issued Over The Air (OTA).

The monitoring process has configurable actions so that negative behavior of the devices and applications deployed on cellular network can be prevented and addressed automatically in a timely manner instead of utilizing time consuming manual procedures. The method and system enable the device owners and other parties such as network operators to eliminate network outages which are very costly. It can be used as a standard methodology by which malicious malware and attacks through devices and applications deployed on cellular networks are prevented or reduced in the future.

As illustrated in FIG. 2b, as data is transmitted over the air between a server and a device, each and every transaction is recorded in traffic and signaling database 291 containing control plane and transaction accounting records. An analytics engine 2101 analyzes the control plane and transaction accounting records to determine if behavior of the device and application 271 deployed as a service solution is violating device conformance rules 241 which are carrier defined performance standards for the device 271. This analytics engine 2101 also incorporates an alert/action engine to send out of compliance push notification to device owner 201 or to correct behavior of the device and/or application 271 if the harmful or aberrant behavior of the devices and/or applications satisfies the predefined parameters for such an action. Such continuous monitoring provides a higher level of confidence to the cellular network operator that out-of-conformance devices and applications will be identified quickly, along with increased security and access to network resources for all customers using services of that cellular network carrier.

Figure 3:
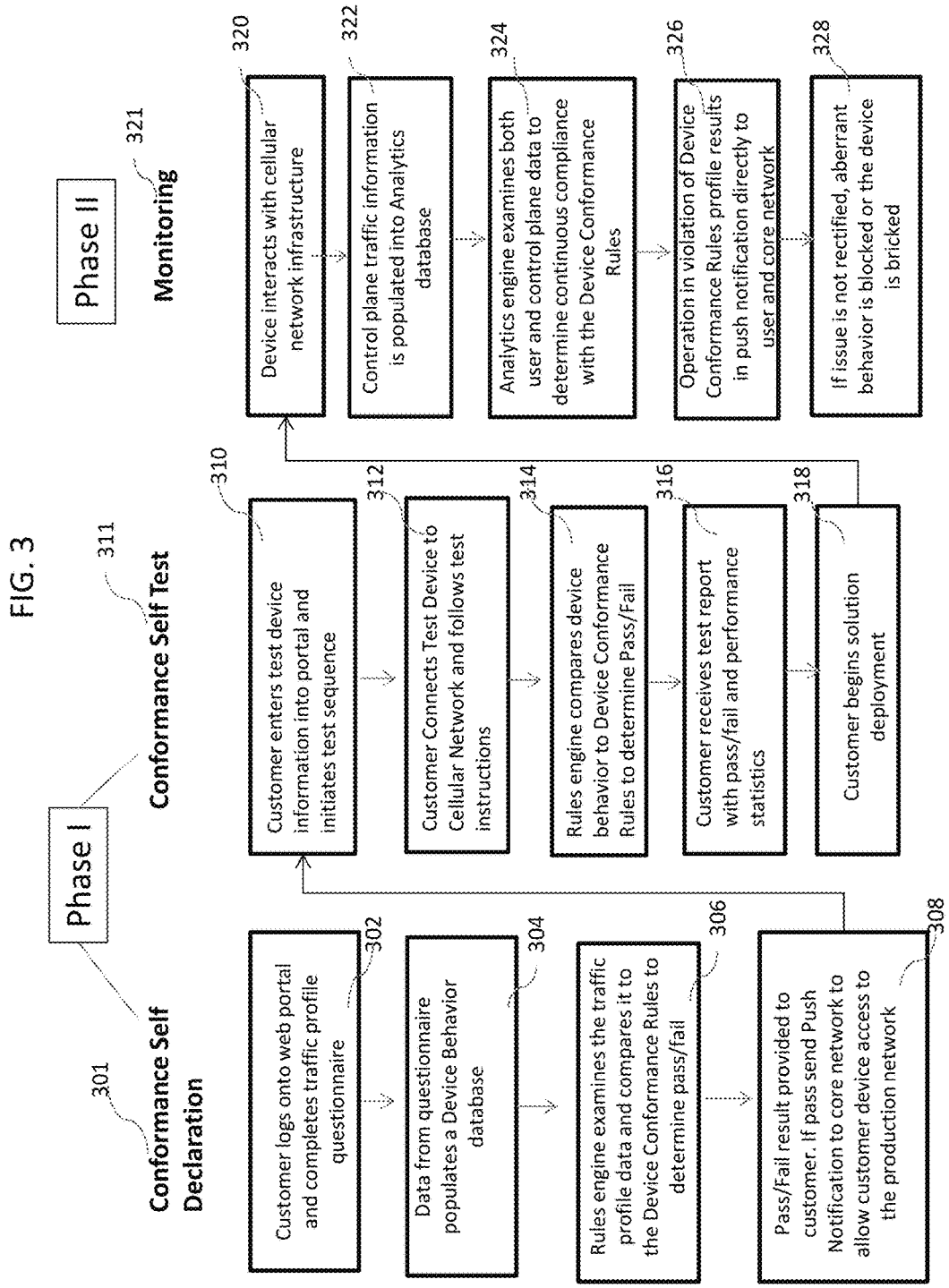
FIG. 3 illustrates a flow chart for a method for detecting and minimizing harmful behavior of devices deployed as self-certified service solutions on cellular networks.

FIG. 3 illustrates a flow chart describing a method for detecting and minimizing harmful application and device behavior on cellular networks for the system shown in FIGS. 2a and 2b. In self-service certification aspect of Phase I, also known as conformance self declaration 301 of an application and device, a device owner logs into a web portal provided by a network operator or other party and completes traffic profile questionnaire via step 302. The device owner enters how their application performs as a response to the questionnaire into the web portal via step 302. Data from the questionnaire populates device behavior database by storing answers to the questionnaire in the device behavior database via step 304. These responses are checked against carrier defined rules also known as device conformance rules for behavior by a rules engine which examines traffic profile data and determines pass/fail by comparing the traffic profile data entered by the device owner with the device conformance rules via step 306. Typical carrier rules include but are not limited to compliance with government regulation such as FCC rules or PTCRB certification, proper initiation of data sessions, proper transmission of data, as either IP data or as an SMS, proper closure of IP sessions, timing and duration of packet sessions, algorithms governing re-try attempts and programming delays and randomness into device behavior across a deployed fleet of devices.

Once the rules engine determines pass/fail by comparing data entered by the device owner with the application and device behavior database, a pass/fail is issued to the device owner via step 308 in the form of push notification from cloud database to portal. In the event of a pass, authorization is then triggered in the core network to allow that device owner's devices a limited access to the network for the purpose of testing the device and the application as an integrated service solution. This is done by an automated trigger on the service profile for that device owner's rate plan which enables the services the device owner will be using for testing.

For conformance self test 311 of the application, a device owner enters test device and application information into web portal and initiates test sequence via step 310. The device owner connects the test device to the provider's network and follows test instructions via step 312. To accomplish this, the device owner goes to the web portal to enter device identification number, for example, IMSI, MEID, MIN, etc. for the device they would like to test and initiate a test. As cellular network provider sees the network registration, it indicates on the portal that the deployed device is visible, and the testing begins. A request is sent to the device owner to take specific steps, which may include, but is not limited to, one or more of power the device on, establish a data session, end a data session, send an SMS, make a voice call, establish a data session and keep it active. Network authentication and accounting records are examined for each of these events to determine success or failure. In addition, depending on the device and application being tested, MT voice and SMS calls are sent to determine functionality. Finally, retry attempts by the device for both network access and data sessions are tested by forcing a break in the connection and capturing device behavior for retries. As the device interacts with cellular network infrastructure via step 312, a rules engine determines if the actual test behavior in key areas for example, retry algorithms conforms to the self-described behavior and/or is in conformance with carrier policy. This automated test functionality enables the device owner to perform network tests in an automated way and receive feedback on performance. The device behavior under test conditions is then compared to the device conformance rules by the rules engine to determine pass/fail via step 314. A test report with pass/fail and performance statistics is provided to the device owner via step 316 and the device owner can then begin deployment of devices as a service solution in the event of "pass" as shown in step 318.

Phase II of the solution, real time monitoring and analysis 321 of network behavior of deployed device and applications, allows carriers to determine if the deployed devices and applications are performing outside of their self-described profile and/or in violation of carrier performance rules. An analytics engine compares live streaming transaction data against known device transaction anomalies. This is done by using authentication and traffic information populated into certification database via step 322 as the deployed device starts interacting with cellular network infrastructure via step 320. Some key information that is captured and logged into a database in this solution is, time stamp of every network registration event from the HLR, underlying carrier of every network registration event from the HLR, success or failure of network registration from the HLR, time stamp of every IP session authentication request from the AAA, data records of amount of data sent during an IP session, IP address assigned to each individual IP session, time stamp of every SMS attempt, success or failure for every SMS attempt, IP address for outbound IP session attempts. User and control plane data is examined by the analytics engine to ensure that the usage is in line with certification via step 324. Operation in violation of device conformance rules profile or anomalous behavior by the device results in push notification directly to the device owner and the core network via step 326.

The action based analytics engine automatically escalates corrective actions if the deployed devices are not performing correctly via steps 326 and 328. This would range from a notification via step 326 to blocking network access, to OTA rendering a deployed device inoperable via step 328. For example, if the issue is not rectified, aberrant behavior is blocked or the deployed device is bricked as shown in step 328. The process has configurable actions so that negative behavior of the deployed device can be prevented and addressed automatically in a timely manner instead of utilizing time consuming manual procedures.

Figure 4:
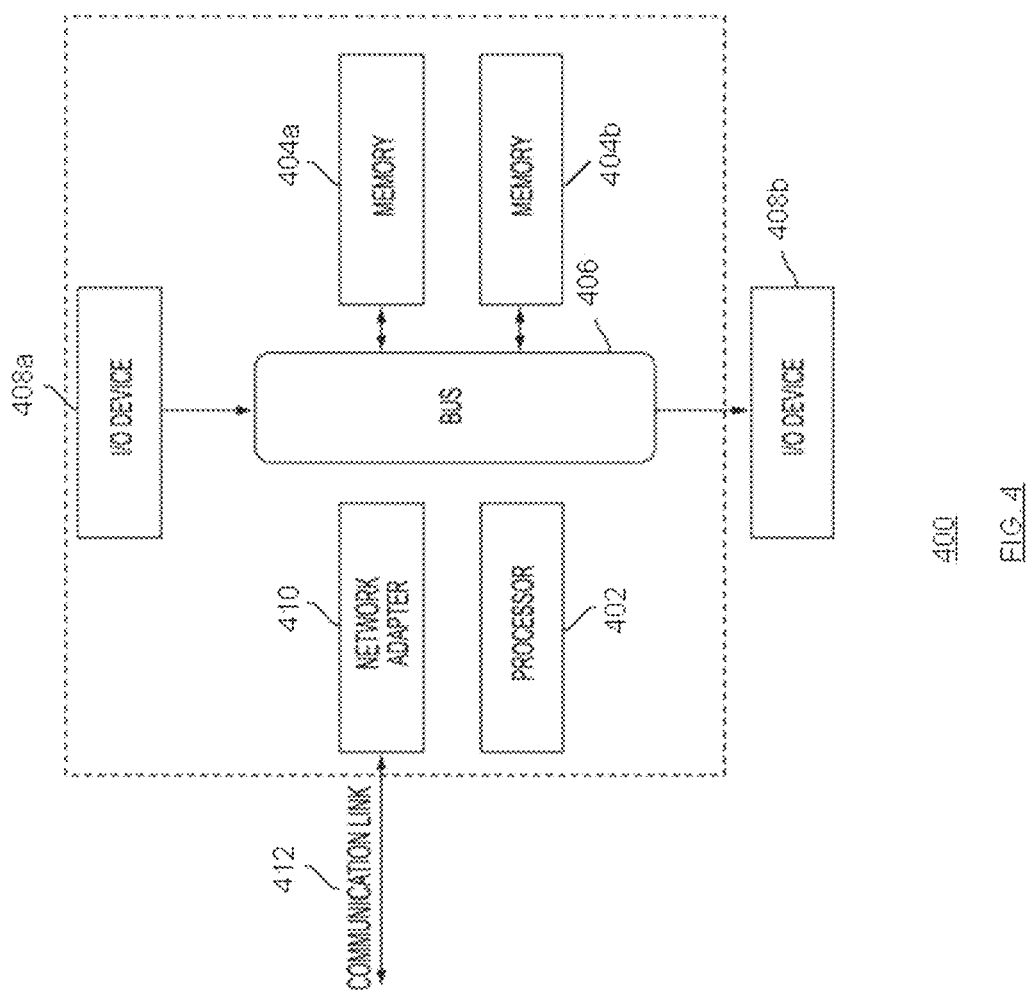
FIG. 4 illustrates a data processing system 400 suitable for storing the computer program product and/or executing program code relating to the choices of the users in accordance with an embodiment of the present invention.

FIG. 4 illustrates a data processing system 400 suitable for storing the computer program product and/or executing program code in accordance with an embodiment of the present invention. The data processing system 400 includes a processor 402 coupled to memory elements 404a-b through a system bus 406. In other embodiments, the data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to the data processing system 400. I/O devices 408a-b may be coupled to the data processing system 400 directly or indirectly through intervening I/O controllers (not shown).

In FIG. 4, a network adapter 410 is coupled to the data processing system 402 to enable data processing system 402 to become coupled to other data processing systems or remote printers or storage devices through communication link 412. Communication link 412 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-RAN).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "cellular network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method comprising:
providing predefined rules of behavior for a deployed device on a cellular network, wherein the deployed device is a device with cellular connectivity deployed with an application;
allowing self-certification of an application to be deployed on the device by
analyzing expected behavior of the device and the application as integrated service solution with respect to conformance with predefined rules of behavior; and
testing the device and the application to determine actual behavior of the deployed device in a production environment with respect to conformance with predefined rules of behavior; and
monitoring network behavior of the deployed device based upon the self certification and testing of the deployed device to detect and inhibit harmful behavior of the deployed device,
wherein the harmful behavior comprises any of multiple requests for data sessions made rapidly from a plurality of deployed devices, multiple requests for data sessions made by the same deployed device through different sources, or a combination thereof, wherein the different sources comprise one or more radio modules, one or more applications working in conjunction with the same deployed device, or a combination thereof.

2. The computer-implemented method of claim 1, wherein the predefined rules comprise rules established by a cellular network carrier for behavior of the deployed device comprising any of:
powering the device on, establishing a data session, sending an SMS or making a voice call, establishing a data session and keeping it active, ending a data session and a combination thereof.

3. The computer-implemented method of claim 1, wherein self-certification of the application comprises:
providing expected behavior of the deployed device after the application is deployed on the device;
comparing the expected behavior of the deployed device with the predefined rules; and
allowing limited cellular network access to the deployed device if the expected behavior of the deployed device conforms with the predefined rules.

4. The computer-implemented method of claim 1, wherein testing of the deployed device comprises:
comparing behavior of the deployed device to the predefined rules established by a cellular network carrier, and
allowing the deployed device to access cellular network if the behavior of the deployed device conforms with the predefined rules.

5. The computer-implemented method of claim 1, wherein monitoring the deployed device comprises:
comparing a real world performance of the deployed device to the predefined rules, and
escalating corrective action if the network behavior of the deployed device is not in conformance with the predefined rules.

6. The computer-implemented method of claim 5, wherein the escalating corrective action comprises any of:
issuing notification to a device owner, blocking network access to the device, over the air rendering of the device inoperable and a combination thereof.

7. A system for detecting harmful behavior of a device over a cellular network comprising:
a processor, and
a memory in communication with the processor wherein the memory containing program instructions which when executed by the processor, perform the following operations comprising:
providing predefined rules of behavior for a deployed device on a cellular network, wherein the deployed device is a device with cellular connectivity deployed with an application;
allowing self-certification of an application to be deployed on the device by
analyzing expected behavior of the device and the application as integrated service solution with respect to conformance with predefined rules of behavior; and
testing the device and the application to determine actual behavior of the deployed device in a production environment with respect to conformance with predefined rules of behavior; and
monitoring network behavior of the deployed device based upon the self certification and testing of the deployed device to detect and inhibit harmful behavior of the deployed device,
wherein the harmful behavior comprises any of multiple requests for data sessions made rapidly from a plurality of deployed devices, multiple requests for data sessions made by the same deployed device through different sources, or a combination thereof, wherein the different sources comprise one or more radio modules, one or more applications working in conjunction with the same deployed device, or a combination thereof.

8. The system of claim 7, wherein the predefined rules comprise rules established by a cellular network carrier for behavior of the deployed device comprising any of:
powering the device on, establishing a data session, sending an SMS or making a voice call, establishing a data session and keeping it active, ending a data session and a combination thereof.

9. The system of claim 7, wherein self-certification of the application comprises:
providing expected behavior of the deployed device after the application is deployed on the device;
comparing the expected behavior of the deployed device with the predefined rules; and
allowing limited cellular network access to the deployed device if the expected behavior of the deployed device conforms with the predefined rules.

10. The system of claim 7, wherein testing of the deployed device comprises:
comparing behavior of the deployed device to the predefined rules established by a cellular network carrier, and
allowing the deployed device to access cellular network if the behavior of the deployed device conforms with the predefined rules.

11. The system of claim 7, wherein monitoring the deployed device comprises:
comparing a real world performance of the deployed device to the predefined rules, and
escalating corrective action if the network behavior of the deployed device is not in conformance with the predefined rules.

12. The system of claim 11, wherein the escalating corrective action comprises any of:
issuing notification to a device owner, blocking network access to the device, over the air rendering of the device inoperable and a combination thereof.

13. A computer program product stored on a non-transitory computer readable medium for detecting harmful behavior of a device over a cellular network, comprising computer readable programming for causing a computer to perform the operations to detect the harmful behavior of the device over a cellular network comprising:
providing predefined rules of behavior for a deployed device on a cellular network, wherein the deployed device is a device with cellular connectivity deployed with an application;
allowing self-certification of an application to be deployed on the device by
analyzing expected behavior of the device and the application as integrated service solution with respect to conformance with predefined rules of behavior; and
testing the device and the application to determine actual behavior of the deployed device in a production environment with respect to conformance with predefined rules of behavior; and
monitoring network behavior of the deployed device based upon the self certification and testing of the deployed device to detect and inhibit harmful behavior of the deployed device,
wherein the harmful behavior comprises any of multiple requests for data sessions made rapidly from a plurality of deployed devices, multiple requests for data sessions made by the same deployed device through different sources, or a combination thereof, wherein the different sources comprise one or more radio modules, one or more applications working in conjunction with the same deployed device, or a combination thereof.

14. The computer program product of claim 13, wherein the predefined rules comprise rules established by a cellular network carrier for behavior of the deployed device comprising any of:
powering at least one of the device on, establishing a data session, sending an SMS or making a voice call, establishing a data session and keeping it active, ending a data session and a combination thereof.

15. The computer program product of claim 13, wherein self-certification of the application comprises:
providing expected behavior of the deployed device after the application is deployed on the device;
comparing the expected behavior of the deployed device with the predefined rules; and
allowing limited cellular network access to the deployed device if the expected behavior of the deployed device conforms with the predefined rules.

16. The computer program product of claim 13, wherein testing of the deployed device comprises:
comparing behavior of the deployed device to the predefined rules established by a cellular network carrier, and
allowing the deployed device to access cellular network if the behavior of the deployed device conforms with the predefined rules.

17. The computer program product of claim 13, wherein monitoring the deployed device comprises:
comparing a real world performance of the deployed device to the predefined rules, and escalating corrective action if the network behavior of the deployed device is not in conformance with the predefined rules.

18. The computer program product of claim 17, wherein the escalating corrective action comprises any of:
issuing notification to a device owner, blocking network access to the device, over the air rendering of the device inoperable and a combination thereof.

* * * * *